United States Patent [19]

Texier

[11] 4,160,128

[45] Jul. 3, 1979

[54] DIGITAL DATA TRANSMISSION SYSTEM PROVIDING MULTIPOINT CONNECTIONS

[76] Inventor: Alain G. Texier, 32, avenue de General de Gaulle, 92360 Meudon-La-Foret, France

[21] Appl. No.: 918,429

[22] Filed: Jun. 23, 1978

Related U.S. Application Data

[63] Continuation-in-part of Ser. No. 781,296, Mar. 25, 1978, abandoned.

[51] Int. Cl.² ............................................... H04J 3/02
[52] U.S. Cl. .......................... 179/15 BA; 179/15 BV; 179/15 AT
[58] Field of Search ........ 179/15 BA, 15 BV, 15 AL, 179/15 AQ, 15 AT

[56] References Cited

U.S. PATENT DOCUMENTS

| Re. 29,215 | 5/1977 | Carney et al. | 179/15 BV |
|---|---|---|---|
| 3,809,819 | 5/1974 | Stephens | 179/15 AQ |
| 3,952,162 | 4/1976 | Texier et al. | 179/15 BV |
| 3,987,251 | 10/1976 | Texier et al. | 179/15 BV |
| 3,988,544 | 10/1976 | Texier et al. | 179/15 BV |
| 4,100,533 | 7/1978 | Napolitano | 179/15 BA |

*Primary Examiner*—Douglas W. Olms
*Attorney, Agent, or Firm*—Abraham A. Saffitz

[57] ABSTRACT

Digital transmission system providing multipoint connections in which a main data transceiver can communicate with a plurality of secondary data transceivers and the secondary data transceivers can each, in turn, communicate with the main data transceiver, transmission occurring via component digital words at certain low rates multiplexed into intermediate rate incoming digital channels which are themselves multiplexed into a high rate incoming highway. The words are given a first partial address in the low to intermediate rate multiplexing step and a second partial address in the intermediate to high rate multiplexing step. A digital switching network is provided for selectively switching the component words from the high rate incoming highway to word positions in a high rate outgoing highway according to their first and second partial addresses. A multipoint unit is connected to the switching network by intermediate rate incoming and outgoing digital channels and the high rate highway. The multipoint unit comprises means for simultaneously transferring the input words assigned to the main transceiver on the intermediate rate incoming digital channel to output word positions assigned to the secondary transceivers on the intermediate rate outgoing digital channel and means for sequentially transferring the input words assigned to the secondary transceivers on the intermediate rate imcoming digital channel to output word positions assigned to the main transceiver on the intermediate rate outgoing digital channel.

4 Claims, 3 Drawing Figures

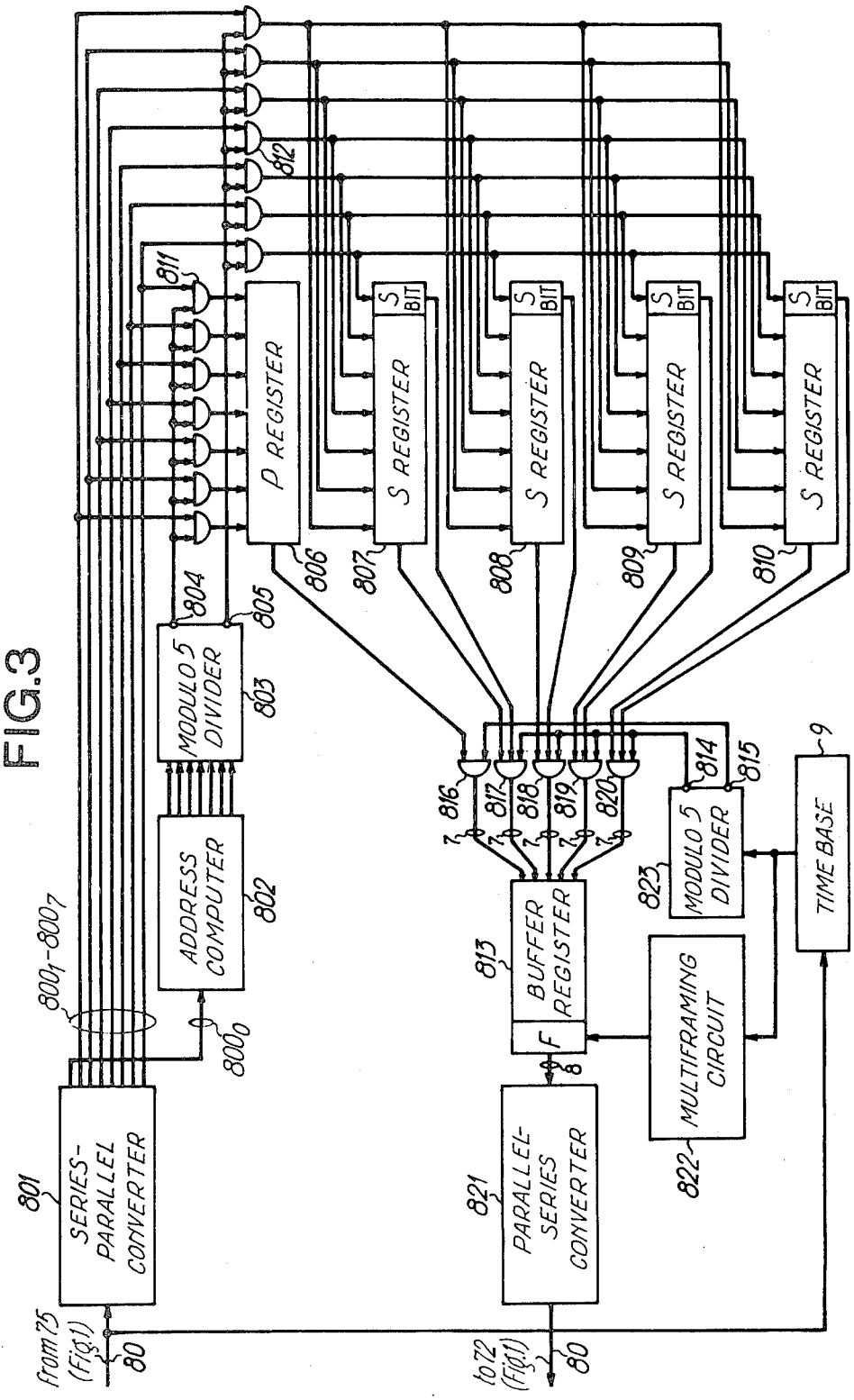

DIGITAL DATA TRANSMISSION SYSTEM PROVIDING MULTIPOINT CONNECTIONS

CROSS REFERENCE TO RELATED APPLICATION

This application is a continuation-in-part of my now abandoned prior application, Ser. No. 781,296, filed Mar. 25, 1978.

BACKGROUND OF THE INVENTION

1. Field of the Invention

The invention relates to a digital data transmission system providing multipoint connections.

Multipoint connections ae defined in "Contribution No. 281" of Studies Committee No. VII of the International Telegraph and Telephone Consultative Committee (C.C.I.T.T.), Sixth Plenary Assembly, Geneva, 1976. In this kind of connection a number of data transceivers or "data terminal equipment" (D.T.E.) are connected to a single data transmission link. One transceiver is the main transceiver and the others are secondary. All of the messages transmitted by the main transceiver reach the secondary transceivers while the secondary transceivers transmit singly and one at a time to the main transceiver.

2. Description of the Prior Art

The fundamental parameters of a multiplexing scheme for the international interface between synchronous data networks is defined in "Recommendation X50" of Internation Telegraph and Telephone Consultative Committee (C.C.I.T.T.), Fifth Plenary Assembly, Geneva, December 1972, Green Book, Volume VIII, Data Transmission, Published by the International Telecommunications Union, pages 201 through 203. According to this recommendation the multiplex aggregate by rate of 64 kbits/s is standardized for international links and framing information for the channels is contained within the 64 kbits/s capability. The signal elements of each individual channel are assembled in octets. The status bits are included in the octets and are allocated to the last bit position in the octets. An octet interleaved structure is used. A distributed framing pattern is used with the framing bits occupying the first bit position in consecutive octets.

It results that, in each octet, the first bit position is reserved for multiplex framing, the second to seventh bit positions are occupied by channel information bits and the eighth bit position is reserved for the status bit. The addition of a framing bit and a status bit to six information or signaling bits results in an increase of one-third in the binary flow rate of information. Consequently, the binry flow rates on the component low rate data are respectively 12.8, 6.4, 3.2 and 0.8 kbits/s when the binary flow rates for the user are 9.6, 4.8, 2.4 and 0.6 kbits/s respectively.

A 64 kbits/s channel be formed by multiplexing five 12.8 kbits/s channels, ten 6.4 kbits/s channels, twenty 3.2 kbits/s channels or eighty or eighty 0.8 kbits/s channels. The octets belonging to the channels at these respective rates will repeat every fifth octet (5 octet frame), every tenth octet (10 octet frame), every twentieth octet (20 octet frame) and every eightieth octet (80 octet frame). In these various frames the lower common multiple of the octet numbers is 80 which is chosen for defining the multiframe.

The 80 octets of a multiframe are referenced by their first bits which form a multiframing sequence. This sequence of bits is pseudo-random and has a period equal to 80 which is obtained in a known manner by a shift register in which a certain number of intermediate stages and the final stage are looped to the input stage via an exclusive OR-gate.

Time division multiplex digital data switching networks are known in the prior art and are, for example, disclosed in U.S. Pat. No. 3,987,251, issued Oct. 19, 1976. In this Patent intermediate rate synchronous digital data channels are made up by time multiplexing a plurality of component digital data having different low rates which are sub-multiples of said intermediate rate. To fix one's ideas, the intermediate rate is 64 kbits/s and the low rates are 0.6, 2.4, 4.8 and 9.6 kbits/s. Then a plurality of 256 incoming 64 kbits/s channels, in which the component low rate data are multiplexed with a period depending on their rates, are in turn multiplexed to form a high rate multiplex highway comprising eight 2.048 kbits/s multiplex junctions on which the octets appear in parallel. Thus each octet in the high rate multiplex highway is defined by an address having a first part of 8 bits (1 out of 256) denoting the channel number in the highway and a second part of 7 bits (1 out of 80) denoting the octet number in the multiframe.

Such a switching network switches a parallel octet from the incoming high rate highway to a parallel octet location in the outgoing high rate highway. More specifically, those octets of the incoming highway which belong to a low rate component channel assigned to a calling subscriber are transferred to the locations of parallel octets in the outgoing highway which belong to a component channel of the same low rate assigned to the called subscriber. After the switching operation has been carried out, new framing bits forming a pseudo-random sequence are disposed in the first bit locations of the outgoing octets. The switching operation depends on signaling information borne by the signaling octets which, as stated, differ from the information octets since they contain a status bit having a different binary value.

In the invention the digital switching network of the prior art is used like a distribution frame, i.e., it permanently connects an incoming low rate component channel to an outgoing low rate component channel. It is not necessary here to repeat the description of the structure of a digital switching network given in the aforementioned United States Patent but sufficient to state that the switching network can be considered as set in the position in which it is placed when a subscriber transmitting digital data has called a called party.

SUMMARY OF THE INVENTION

According to the invention there is provided a multipoint connection digital transmission system in which a main data transceiver can communicate with a plurality of secondary data transceivers and the secondary data transceivers can each in turn communicate with the main data transceiver, transmission occuring via component digital words at low rates which are different from but multiples of one another, said digital transmission comprising:

first means for multiplexing input component words transmitted by said main and secondary transceivers into incoming digital channels having an intermediate rate with periodicities equal to the respective ratio of said intermediate rate to said low rates, said multiplexed component words forming in each said incoming channel a multiframe respectively and the positions of said input words in a multiframe being given by a first partial address in said first multiplexing means and being selectively assigned to said main and secondary transceivers;

second means for multiplexing a plurality of said intermediate rate incoming digital channels into an incoming highway having a high rate, said input words being given by a second partial address in said second multiplexing means;

means for selectively switching said input component words from said high rate incoming highway to output word positions in an outgoing highway having said high rate according to said first and second partial addresses thereof;

first means for demultiplexing said high rate outgoing highway into a plurality of outgoing digital channels having said intermediate rate;

second means for demultiplexing each of said intermediate rate outgoing digital channels into output component words to be received by said main and secondary transceivers; and a multipoint unit connected to said switching means by said second multiplexing means and first demultiplexing means via an incoming digital channel and an outgoing digital channel having said intermediate rate, said multipoint unit including means for simultaneously transferring the input words assigned to the main transceiver of each of said multipoint connections on said intermediate rate incoming digital channel to output word positions assigned to the secondary transceivers of said multipoint connection on said intermediate rate outgoing digital channel and means for sequentially transferring the input words assigned to the secondary transceiver of said multipoint connection which communicates with said main transceiver on said intermediate rate incoming digital channel to output word positions assigned to said main transceiver on said intermediate rate outgoing digital channel.

BRIEF DESCRIPTION OF THE DRAWINGS

The invention will now be described in detail with reference to the accompanying drawings in which:

FIG. 3 is a detailed view of the multipoint unit.

BRIEF DESCRIPTION OF THE PREFERRED EMBODIMENT

Figure 1:
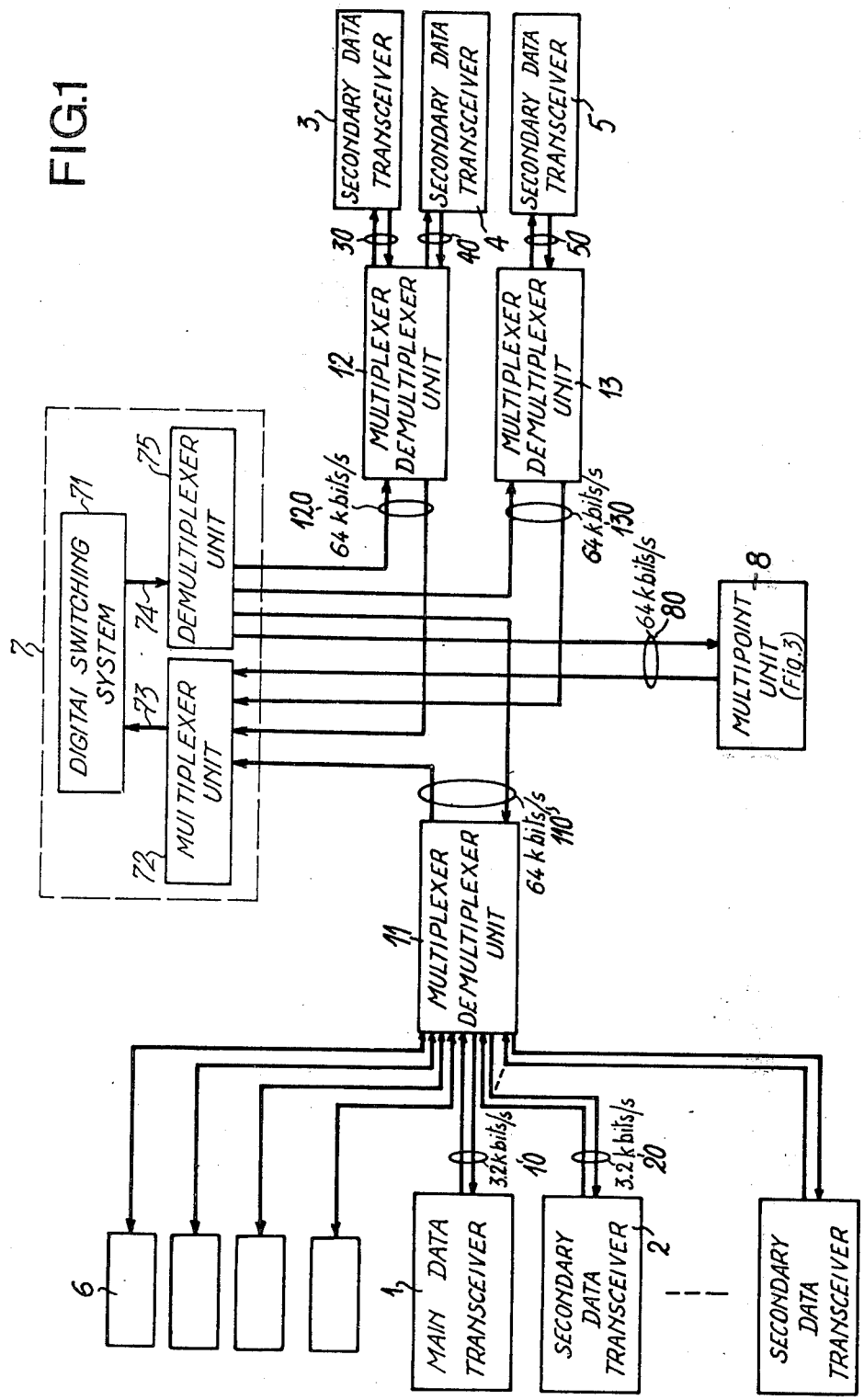
FIG. 1 is a block diagram showing the multipoint digital transmission system.

FIG. 1 shows data transceivers 1, 2, 3, 4 and 5 transmitting 3.2 kbits/s digital trains to multiplexers or receiving such trains from demultiplexers. Data transceiver 1 is a main transceiver according to the definitions in the introductory part of this application and is connected to a multiplexer and a demultiplexer unit 11 by a 3.2 kbits/s bidirectional digital transmission link 10. Data transceiver 2 is a second transceiver with regard to these definitions and is connected to the multiplexer and demultiplexer unit 11 by a bidirectional digital transmission link 20. Data transceivers 3 and 4 are secondary transceivers and are connected to multiplexer and demultiplexer unit 12 by bidirectional digital transmission links 30 and 40. Data transceiver 5, which is likewise secondary, is connected to multiplexer and demultiplexer unit 13 by a bidirectional digital transmission link 50.

Data transceivers 6 having a rate of 0.8 kbits/s have also been drawn to show that the multiplexer and demultiplexer units can multiplex and demultiplex incoming data of different rates provided these rates are submultiples of 64 kbits/s.

Units 11, 12 and 13 are connected to the digital distribution frame 7 by 64 kbits/s bidirectional digital transmission lines 110, 120 and 130. Multipoint unit 8 is connected to frame 7 by a 64 kbits/s bidirectional digital transmission line 80 in exactly the same manner as units 11, 12 and 13.

As already stated, frame 7 comprises a digital switching system 71 providing permanent connections. It receives serial octets from 64 kbits/s channels 110, 120, 130 and others (not shown) and, by means of multiplexer unit 72, converts these serial octets into parallel octets on the incoming high rate multiplex highway 73; then the digital switching system transfers those incoming parallel octets which originate from transceivers 1, 2, 3, 4 and 5 to outgoing parallel octet positions in a selected part of the outgoing high rate multiplex highway 74; finally, by means of a demultiplexer unit 75, the outgoing parallel octets are converted to serial octets in 64 kbits/s incoming digital channel 80 terminating at multipoint unit 8. During the transfer from the incoming highway 73 to the outgoing highway 74, the multiframing sequence bits of the incoming parallel octets are deleted and new multiframing sequence bits are substituted for the old ones in the outgoing parallel octets.

By means of an octet address computer the multipoint unit 8 calculates the addresses of the incoming octets and deduces that they come from transceivers 1, 2, 3, 4 or 5. An octet address computer identifying the octets from their "1 out of 80" first partial address and their "1 out of 256" second partial address in which the first partial address is derived from that bit of the pseudo-random multiframing sequence assigned to the octet is fully disclosed in U.S. Pat. No. 3,952,162 issued on Apr. 20, 1976.

The 80 octet addresses in the multiframe on the time division multiplex line 80 are divided into 17 groups. The first group has 16 addresses, e.g., 0, 5, 10, 15, ... 70, 75 (modulo 5, remainder 0). The 64 remaining addresses (modulo 5, remainder 1, 2, 3 or 4) are divided into 16 groups of 4 as follows: 1, 2, 3, 4; 6, 7, 8, 9; 11, 12, 13, 14; ... 76, 77, 78, 79.

The addresses of the first group are allocated to the main octets, i.e., the octets transmitted by the main transceivers. The addresses of the other 16 groups are allocated to the secondary octets, i.e., to those transmitted by the secondary transceivers.

As already stated, a 3.2 kbits/s channel transmits 4 octets per 80-octet multiframe, corresponding to 4 addresses per multiframe. In the disclosed multipoint unit embodiment there are 16 main octet addresses. Consequently the multipoint unit can provide 16/4=4 multipoint communications at 3.2 kbits/s between a main transceiver and four secondary transceivers. More generally, if M is the number of octets in the multiframe, $r_1$, $r_2$, $r_n$ are the low data rates which are sub-multiples of the intermediate data rate R.

$$R = k_1 r_1 = k_2 r_2 = \ldots k_n r_n$$

($k_1, k_2, \ldots k_n$, integers and M=least common multiple $k_1, k_2, \ldots k_n$) the number N of multipoint communications between a main transceiver and S secondary transceiver is $$N = k_i/(1+S)$$

If $1+S=5$, $r_i=6.4$ kbits/s wherefrom $k_i=10$, then $N=2$ and if S is always equal to 4, $r_i=12.8$ kbits/s wherefrom $k_i=5$, then $N=1$.

The disclosed multipoint unit can therefore have a capacity of four main transceivers, each linked to four secondary transceivers through 3.2 kbits/s links or two main transceivers each linked to four secondary transceivers through 6.4 kbits/s links or one main transceiver linked to four secondary transceivers through to a 12.8 kbits/s link.

Figure 2:
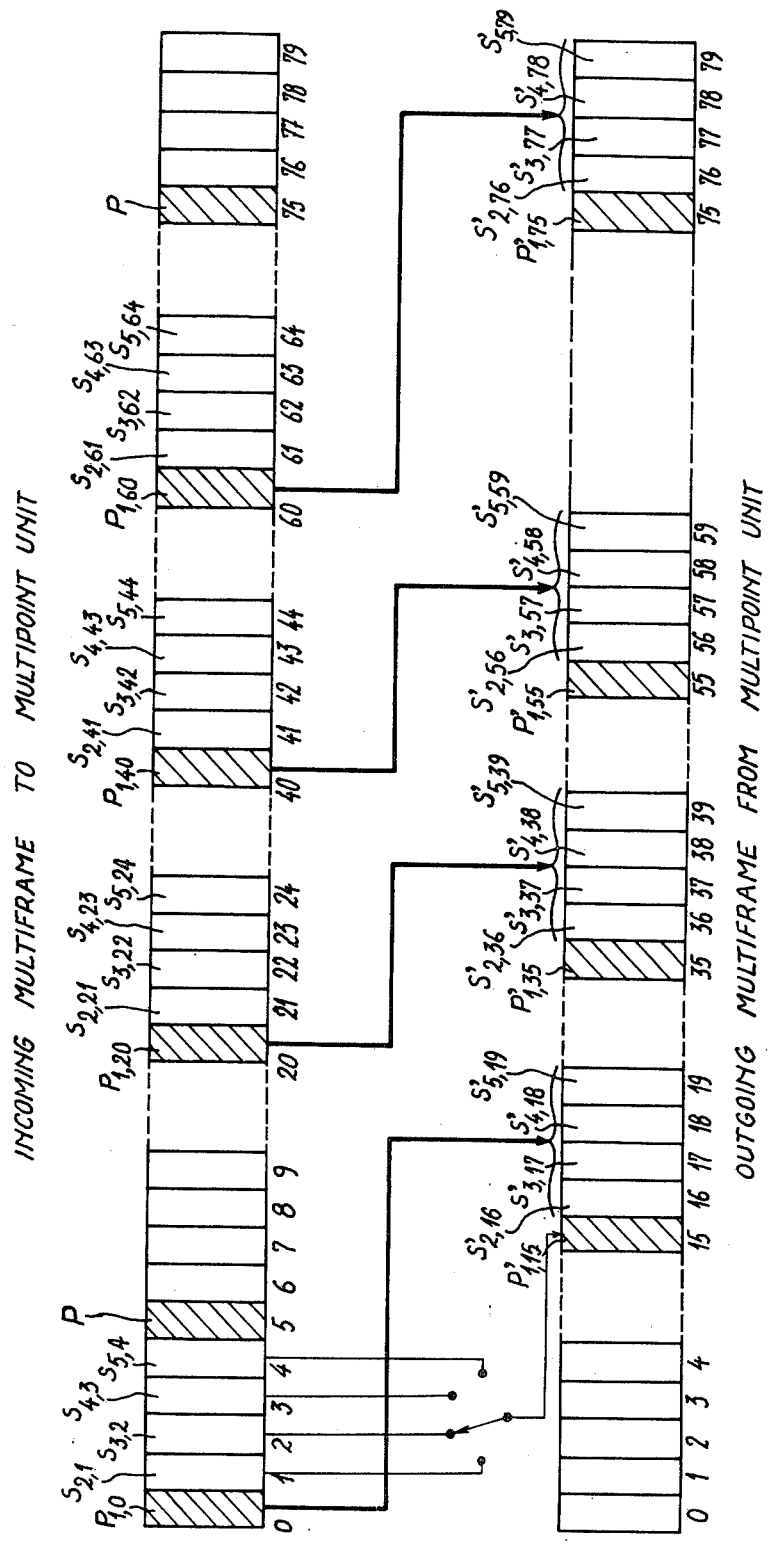
FIG. 2 is a diagram of pulse trains illustrating the operation of the multipoint unit forming part of the transmission system.

FIG. 2 shows the 64 kbits/s incoming multiframe to multipoint unit 8. Octets P have the addresses of the first address group of 16 and come from the main transceiver 1 and octets S have the addresses of the 16 address groups of four and come from the secondary transceivers. The 64 kbits/s outgoing multiframe is also shown, using the conventions. The four octets of the incoming multiframe coming from the main transceiver 1 are denoted $P_{1,0}$, $P_{1,20}$, $P_{1,40}$, $P_{1,60}$, where the first subscript denotes the original main transceiver and the second subscript denotes the address of the octet in the multiframe; the four octets of the miltiframe which come from the secondary transceiver 2 are denoted $S_{2,1}$, $S_{2,21}$, $S_{2,41}$, $S_{2,61}$, and the four octets of the multiframe which come from the secondary transceiver 5 are denoted $S_{5,4}$, $S_{5,24}$, $S_{5,44}$, $S_{5,64}$. The four octets of the outgoing multiframe addressed to the main transceiver 1 are denoted $P'_{1,15}$, $P'_{1,35}$, $P'_{1,55}$, $P'_{1,75}$, the four octets from the multiframe addressed to the secondary transceiver 2 are denoted $S'_{2,16}$, $S'_{2,36}$, $S'_{2,56}$, $S'_{2,76}$ and the other octets of the multiframe, addressed to transceiver 5, are denoted $S'_{5,19}$, $S'_{5,39}$, $S'_{5,59}$, $S'_{5,79}$.

The multipoint unit ensures that the re-transmitted secondary octets $S'_{2,16}$, $S'_{3,17}$, $S'_{4,18}$, $S'_{5,19}$ are made identical with the received main octet $P_{1,0} \ldots$ and the re-transmitted secondary octets $S'_{2,76}$, $S'_{3,77}$, $S'_{4,78}$, $S'_{5,79}$ are made identical with the received main octet $P_{1,60}$. The multipoint unit also ensures that the re-transmitted main octets $P'_{1,15}$, $P'_{1,35}$, $P'_{1,55}$, $P'_{1,75}$ are made identical with the received secondary octets $S_{2,1}, S_{2,21}, S_{2,41}, S_{2,61}$ or $S_{3,2}, S_{3,22}, S_{3,42}, S_{3,62}$ or $S_{4,3}, S_{4,23}, S_{4,43}, S_{4,63}$ or $S_{5,4}, S_{5,24}, S_{5,44}, S_{5,64}$, depending on the value of the status bits of these octets.

Referring now to FIG. 3, the multipoint unit 8 comprises a series-parallel converter 801 converting the octets received in series on the 64 kbits/s transmission line 80 into octets in parallel on wires, $800_0$ to $800_7$. Wire $800_0$ conveys the framing pseudo-random sequence bits and is connected to an octet address computer 802 of a kind described in the aforementioned U.S. patent and gives the address of each octet as it is received (between 0 and 79) on seven wires.

As previously stated, the addresses are divided into a first group of 16 and 16 groups of 4. The addresses of the group of 16 are multiples of 5; the addresses of the 16 groups of 4 are multiples of 5 with remainder 1, 2, 3 or 4 respectively. The address computer 802 is connected to a modulo 5 divider 803 which outputs a signal at terminal 804 or 805 depending on whether the address fed to the divider belongs to the first group or the other groups.

The signal at output 804 controls the input of the octet (reduced by 7 bits) into register 806 via seven AND-gates, 811, and the signal on output 805 controls the input of the octet (reduced to 7 bits) into registers 807, 808, 809 and 810 via seven AND-gates 812.

Registers 806 through 810 are connected to a buffer register 813 via AND-gates (more exactly via groups of seven AND-gates) 816 through 820 respectively. A time base 9 synchronized with the flow rate of the incoming bits sends counting pulses (0 to 79) to a multiframing circuit 822 and a modulo 5 divider 823. The multiframe locking circuit 822 produces a pseudo-random bit sequence F which is sent to the first stage of the buffer register 813 for insertion, as the first bit, in each outgoing octet.

The modulo 5 divider 823 has two output terminals 814 and 815; a signal appears at terminal 814 when the address is a multiple of 5 and at terminal 815 when the address is a multiple of 5 with a remainder of 1, 2, 3 or 4. Output terminal 815 controls gate 816, which is thus opened during four successive octets. Consequently, the octet P in register 806 is sent four times running into the buffer register 813 where the multiframing circuit has a different bit F each time, resulting in the transmission of four octets S' identical with octet P.

Gates 817 through 820 are controlled by output terminal 814 of divider 823 and by the bit S written in the last stage of registers 807 through 810. Thus, the octet from the secondary transceivers having a bit S equal to unity is sent to the numerical distribution frame. This results in the sending of an octet P' which is identical with one of the octets S. Of course, the procedure whereby the secondary transceivers reply to the main transceiver must be such that two secondary transceivers do not transmit simultaneously, i.e., the bit S from each secondary transceiver must not be equal to unity at the same time.

The invention has been described with reference to an embodiment but, of course, its scope is limited only by the claims given hereinafter. More particularly, the envelopes transmitted by the multipoint transmission need not be octets.

Having thus disclosed, I now claim:

1. A digital transmission system providing multipoint connections in which a main data transceiver can communicate with a plurality of secondary data transceivers and the secondary data transceivers can each, in turn, communicate with the main data transceivers, transmission occuring via component digital words at low rates which are different from but multiples of one another, said digital transmission system comprising:

first means for multiplexing input component words transmitted by said main and secondary transceivers into incoming digital channels having an intermediate rate, with periodicities equal to the respective ratios of said intermediate rate to said low rates, said multiplexed input component words forming in each said incoming channel a multiframe respectively and the positions of said input words in a multiframe being given by a first partial address in said first multiplexing means and being selectively assigned to said main and secondary transceivers;

second means for multiplexing a plurality of said intermediate rate incoming digital channels into an incoming highway having a high rate, said input words being given by a second partial address in said second multiplexing means;

means for selectively switching said input component words from said high rate incoming highway to output word positions in an outgoing highway having said high rate according to said first and second partial addresses thereof;

first means for demultiplexing said high rate outgoing highway into a plurality of outgoing digital channels having said intermediate rate;

second means for demultiplexing each of said intermediate rate outgoing digital channels into output component words to be received by said main and secondary transceivers; and a multipoint unit connected to said switching means by said second multiplexing means and first demultiplexing means via an outgoing digital channel and an incoming digital channel having said intermediate rate, said multipoint unit including means for simultaneously transferring the input words assigned to the main transceiver of each of said multipoint connections on said intermediate rate incoming digital channel to output word positions assigned to the secondary transceivers of said multipoint connection on said intermediate rate outgoing digital channel and means for sequentially transferring the input words assigned to the secondary transceiver of said multipoint connection which communicates with said main transceiver on said intermediate rate incoming digital channel to output word positions assigned to said main transceiver on said intermediate rate outgoing digital channel.

2. A digital transmission system providing multipoint connections according to claim 1 in which said component words are octets and said first partial addresses giving said word positions in each said multiframe are bits forming a pseudo-random sequence and allocated to the first bit position in said octets.

3. A digital transmission system providing multipoint connections according to claim 1 in which the secondary transceivers of each of said multipoint connections are at the most S in number and said word positions in the multiframe respectively assigned to said main and secondary transceivers of each of said multipoint connections are $(1+S)$ consecutive word positions.

4. A digital transmission system providing multipoint connections in which a main data transceiver of each of said multipoint connections can communicate with a plurality of S secondary data transceivers of said multipoint connections and said secondary data transceivers can each, in turn, communicate with said main data transceiver, transmission occuring via component digital words at low rates which are different from but multiples of one another, said digital transmission system comprising:

first means for multiplexing input component words transmitted by said main and secondary transceivers into incoming digital channels having an intermediate rate, with periodicities equal to the respective ratios of said intermediate rate to said low rates, said multiplexed input component words forming in each of said incoming channels a multiframe respectively and being allocated address bits forming a pseudo-random sequence in said first multiplexing means and being selectively assigned to said main and secondary transceivers.

second means for multiplexing a plurality of said intermediate rate incoming digital channels into an incoming highway having a high rate, said input words being given by a partial address in said second multiplexing means;

means for selectively switching said input component words from said high rate incoming highway to output word positions in an outgoing highway having said high rate according to said address bits and partial addresses thereof;

first means for demultiplexing said high rate outgoing highway into a plurality of outgoing digital channels having said intermediate rate;

second means for demultiplexing each said intermediate rate outgoing digital channels into output component words to be received by said main and secondary transceivers; and a multipoint unit connected to said switching means by said secondary multiplexing means and first demultiplexing means via an outgoing channel and an incoming digital channel having said intermediate rate, said multipoint unit including an address computer converting into word addresses said pseudo-random sequence address bits allocated to said input words on said intermediate rate incoming digital channel, a modulo $(1+S)$ divider receiving said input word addresses and selectively generating a first signal when the address division remainder is zero and a second signal when the address division remainder is a non-zero remainder, a main register controlled by said first signal for storing the contents of the input word assigned to each of said main transceivers, a plurality of S secondary registers controlled by said second signal for storing the contents of the input words assigned to said secondary transceivers of each of said multipoint connections, means for transferring each said main transceiver word content of said main register to the output word positions assigned to said secondary transceivers of the same multipount connection on said intermediate rate outgoing digital channel, and means for transferring the content of one of said secondary registers which respectively corresponds to said secondary transceiver out of S communicating with said main transceiver to the output word positions assigned to said main transceiver on said intermediate rate outgoing channel.

* * * * *